(12) United States Patent
Mollenkopf et al.

(10) Patent No.: US 7,627,402 B2
(45) Date of Patent: Dec. 1, 2009

(54) DEVICE AND METHOD FOR DESIGNING POWER LINE COMMUNICATION SYSTEM NETWORKS

(75) Inventors: James Douglas Mollenkopf, Fairfax, VA (US); Ronald E. Huebner, Waterford, VA (US)

(73) Assignee: Current Technologies, LLC, Germantown, MD (US)

( * ) Notice: Subject to any disclaimer, the term of this patent is extended or adjusted under 35 U.S.C. 154(b) by 551 days.

(21) Appl. No.: 11/254,733

(22) Filed: Oct. 21, 2005

(65) Prior Publication Data

US 2007/0093995 A1    Apr. 26, 2007

(51) Int. Cl.
    G06F 17/50    (2006.01)
(52) U.S. Cl. ............................................ 701/1; 703/13
(58) Field of Classification Search ................. 340/538, 340/310.11–310.18, 538.17, 572.4; 375/257–260; 455/41.1; 700/22, 29, 286, 291–295; 713/163, 713/320, 321; 703/4, 13, 1, 3
    See application file for complete search history.

(56) References Cited

U.S. PATENT DOCUMENTS

| | | | |
|---|---|---|---|
| 6,668,058 | B2 | 12/2003 | Grimes |
| 6,965,302 | B2 | 11/2005 | Mollenkopf et al. |
| 7,026,917 | B2 | 4/2006 | Berkman |
| 7,295,119 | B2 * | 11/2007 | Rappaport et al. ....... 340/572.4 |
| 2003/0185237 | A1 | 10/2003 | Baker, Jr. |
| 2003/0227373 | A1 | 12/2003 | Lou et al. |
| 2004/0004538 | A1 | 1/2004 | Mansi et al. |
| 2004/0110483 | A1 * | 6/2004 | Mollenkopf ................ 455/402 |
| 2007/0008074 | A1 | 1/2007 | Mollenkopf et al. |

OTHER PUBLICATIONS

Bostoen et al., "Modelling the Low Voltage Power Distribution Network in the Frequency Band From 0.5 MHZ to 30 MHZ for Broadband Powerline Communication PLC", IEEE, 2000.*

Jee et al., "Demonstration of the Technical Viability of PLC Systems on Medium and Low Voltage Lines in the United States", IEEE, 2003.*

Power System Communications Committee, "Summary of an IEEE guide for power-line carrier applications", IEEE 1980.*

Zyren et al., "Tutorial on Basic Link Budget Analysis", Intersil, Jun. 1998.*

(Continued)

*Primary Examiner*—Kidest Bahta
*Assistant Examiner*—Carlos Ortiz Rodriguez
(74) *Attorney, Agent, or Firm*—Mel Barnes; Capital Legal Group, LLC

(57) ABSTRACT

A method of designing a power line communication system networks is provided. One embodiment of the present invention may include identifying a position of a backhaul point on a medium voltage power line, identifying positions for a plurality of bypass devices on the medium voltage line that are configured to communicate with the backhaul point, determining an anticipated attenuation for a communication link associated with each of the bypass devices, and comparing the anticipated attenuations with a link budget value. If the anticipated attenuation of any of the communication links is greater than the link budget, the method may include further improving the network by changing the coupling conductor or employing lower through loss couplers for select devices.

47 Claims, 5 Drawing Sheets

OTHER PUBLICATIONS

Liu et al, "Nature of Power Line Medium and Design Aspects for Broadband PLC System", IEEE 2000.*

Power Line Subcommittee of the Power System Communications Committee, "IEEE P643/Draft13, Draft Guide for Power-Line Carrier Applications", IEEE Jun. 2004.*

"Centralized Commercial Building Applications with the Lonworks® PLT-21 Power Line Transceiver", *Lonworks Engineering Bulletin, Echelon*, (Apr. 1997),1-22.

Horiguchi, Akira, "High Speed Power Line Communication Technology", *Mitsubishi Electric Advance* vol. 109, (Mar. 2005),1-27.

* cited by examiner

DEVICE AND METHOD FOR DESIGNING POWER LINE COMMUNICATION SYSTEM NETWORKS

FIELD OF THE INVENTION

The present invention generally relates to data communications over a power distribution system and more particularly, to a device and methods for designing a power line communication network.

BACKGROUND OF THE INVENTION

Well-established power distribution systems exist throughout most of the United States, and other countries, which provide power to customers via power lines. With some modification, the infrastructure of the existing power distribution systems can be used to provide data communication in addition to power delivery, thereby forming a power line communication system (PLCS). In other words, existing power lines, that already have been run to many homes and offices, can be used to carry data signals to and from the homes and offices. These data signals are communicated on and off the power lines at various points in the power line communication system, such as, for example, near homes, offices, Internet service providers, and the like.

In one example PLCS embodiment, a backhaul point forms the gateway between the power line and a conventional telecommunications medium and communicates with a plurality of downstream communication devices such as transformer bypass devices. The backhaul point and its plurality of communication devices (and their associated user devices) form a PLCS subnet.

In order to compete with other types of network access technologies, a PLCS network must designed economically, while delivering competitive service quality. Thus, while it is important to manufacture the power line communication (PLC) equipment in a cost effective manner, it is also important to design the PLCS network to efficiently utilize the PLCS network equipment and to minimize ancillary network costs such as backhaul media costs. Therefore, there remains a need for a device and method for designing PLCS networks that provide efficient use of PLC equipment that also considers ancillary network costs.

SUMMARY OF THE INVENTION

The present invention provides a method of designing a power line communication system networks. One embodiment of the present invention may include identifying a position of a backhaul point on a medium voltage power line, identifying positions for a plurality of bypass devices on the medium voltage line that are configured to communicate with the backhaul point, determining an anticipated attenuation for a communication link associated with each of the bypass devices, and comparing the anticipated attenuations with a link budget value. If the anticipated attenuation of any of the communication links is greater than the link budget, the method may include further improving the network by changing the coupling conductor or employing lower through loss couplers for select devices.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, data and network protocols, software products and systems, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, operating systems, development interfaces, and hardware are omitted so as not to obscure the description of the present invention.

System Architecture and General Design Concepts

Figure 1:
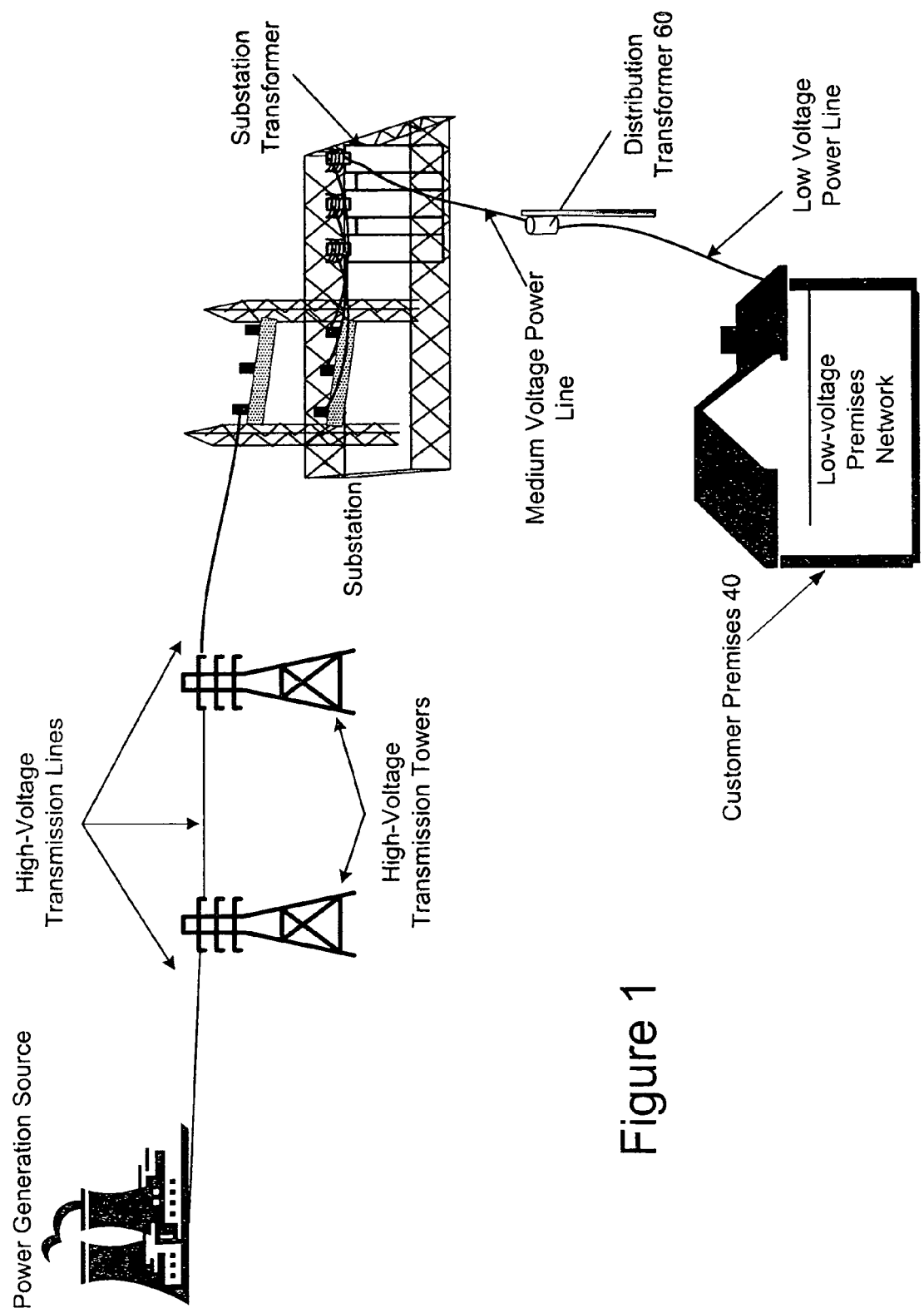
FIG. 1 is a diagram of an exemplary overhead power distribution system with which the present invention may be employed.

FIG. 1 illustrates an example power distribution systems. In addition to HV transmission lines, power distribution systems include MV power lines and LV power lines. MV typically ranges from about 1000 V to about 70 kV and LV typically ranges from about 100 V to about 240 V or more. Transformers are used to convert between the respective voltage portions, e.g., between the HV section and the MV section and between the MV section and the LV section. Transformers have a primary side for connection to a first voltage (e.g., the MV section) and a secondary side for outputting another (usually lower) voltage (e.g., the LV section). Such transformers are often referred to as distribution transformers or a step down transformers, because they "step down" the voltage to some lower voltage. Transformers, therefore, provide voltage conversion for the power distribution system. Thus, power is carried from substation transformer to a distribution transformer over one or more MV power lines. Power is carried from the distribution transformer to the customer premises via one or more LV power lines.

In addition, a distribution transformer may function to distribute one, two, three, or more phase power signals to the customer premises, depending upon the demands of the user. In the United States, for example, these local distribution transformers typically feed anywhere from one to ten homes, depending upon the concentration of the customer premises in a particular area. Distribution transformers may be poletop transformers located on a utility pole, pad-mounted transformers located on the ground, or transformers located under ground level or in a building.

Power Line Communication System

The present invention provides a method of designing a PLCS network using available equipment. Thus, the following brief description provides one example PLCS with which the present invention may be used.

Figure 2:
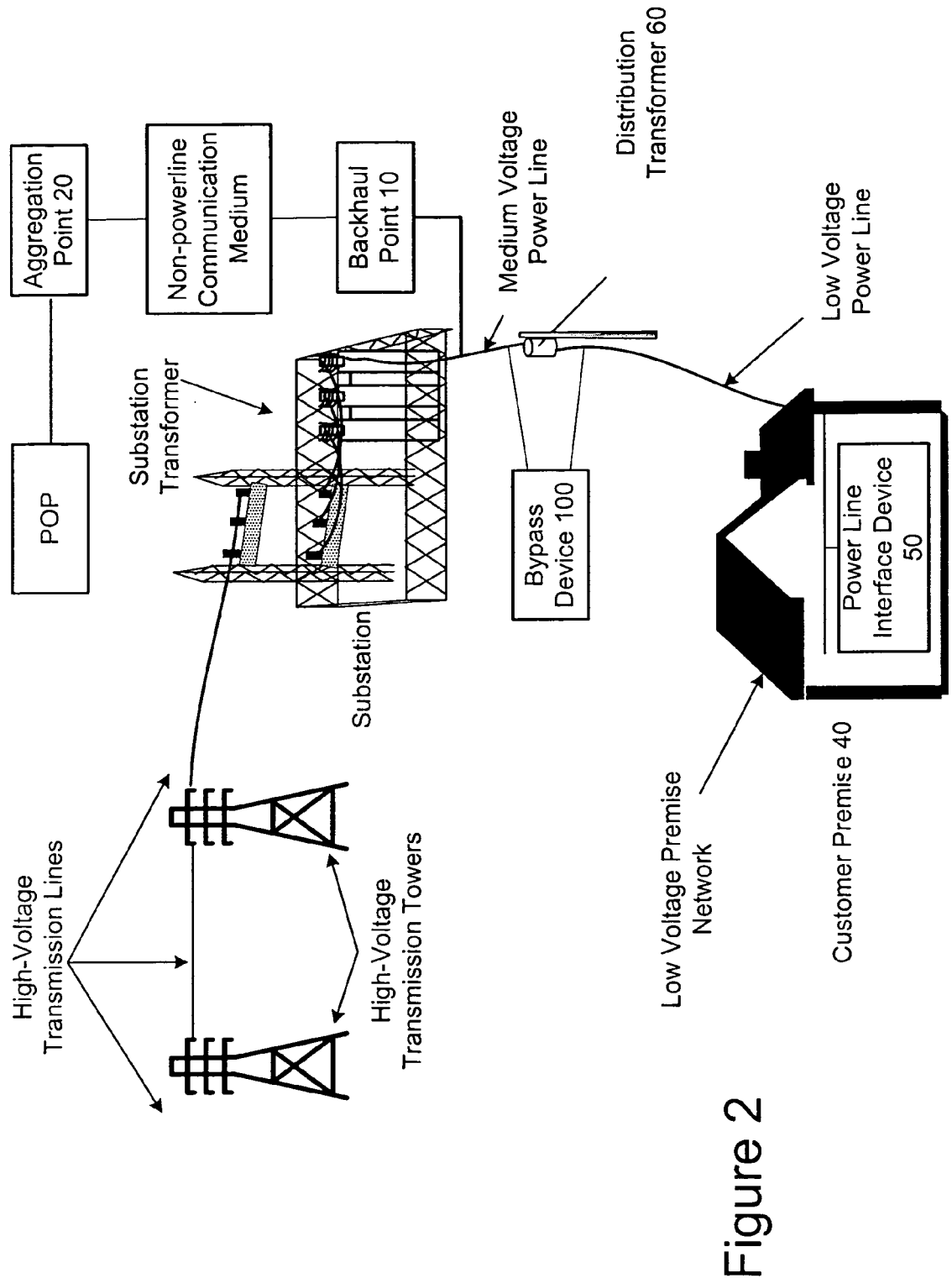
FIG. 2 is a diagram of the exemplary power distribution system of FIG. 1 operating as a power line communications system.

A portion of an example overhead PLCS is shown in FIG. 2 and includes one or more communications devices, which may be transformer bypass devices (BDs). In this illustration, only one communications device (bypass device 100) is depicted. However, in practice five, ten, or more communications devices may form part of a single PLCS subnet and may be positioned on the MV power line each side of the backhaul point. The communications device in this embodiment is a bypass device 100 that is the gateway between the LV power line subnet (i.e., the LV power lines and the devices that are communicatively coupled to the LV power lines) and the MV power line.

In this embodiment, the BD 100 provides communications services for the user devices, which may include security management, routing of Internet protocol (IP) packets, filtering data, access control, service level monitoring, signal processing and modulation/demodulation of signals transmitted over the power lines.

In this example PLCS, the PLCS subnet also includes a backhaul point 10. The backhaul point 10 is an interface and gateway between the power line and a non-power line telecommunications network. One or more backhaul points 10 typically are communicatively coupled to an aggregation point (AP) 20 that may be coupled to, be co-located with, or form part of a point of presence (POP) to the Internet. The backhaul point 10 may be connected to the AP 20 using any available mechanism, including fiber optic conductors, T-carrier, Synchronous Optical Network (SONET), or wireless techniques. Thus, the backhaul point 10 includes a transceiver suited for communicating through the non-power line telecommunications medium (hereinafter the "backhaul link") to its upstream device.

The PLCS also may include a power line server (PLS) that is a computer system with memory for storing a database of information about the PLCS and includes a network element manager (NEM) that monitors and controls the PLCS. The PLS allows network operations personnel to provision users and network equipment, manage customer data, and monitor system status, performance and usage. The PLS may reside at a remote operations center to oversee a group of communication devices via the Internet. The PLS may provide an Internet identity to the network devices by assigning the devices (e.g., user devices, BDs 100, (e.g., the LV modems and MV modems of BDs), LV and MV repeaters, backhaul points 10, and AP 20) an IP address and storing the IP address and other device identifying information (e.g., the device's location, address, serial number, etc.) in its memory. In addition, the PLS may approve or deny user devices authorization requests, command status reports and measurements from the BDs, repeaters, and backhaul points, and provide application software upgrades to the communication devices (e.g., BDs, backhaul points, repeaters, and other devices). The PLS, by collecting electric distribution network (EDN) information and interfacing with utilities' back-end computer systems may provide enhanced distribution services such as automated meter reading, outage detection, load balancing, distribution automation, Volt/Volt-Amp Reactance (Volt/VAr) management, and other similar functions. The PLS also may be connected to one or more APs and/or core routers directly or through the Internet and therefore can communicate with any of the BDs, repeaters, user devices, backhaul points and other network elements through the respective AP and/or core router.

At the user end of the PLCS, data flow originates from a user device, which provides the data to a power line modem (PLM), which is well-known in the art. The BD 100 typically transmits the data to the backhaul point 10, which, in turn, transmits the data to the AP 20. The AP 20 then transmits the data to the appropriate destination (perhaps via a core router), which may be a network destination (such as an Internet address) in which case the packets are transmitted to, and pass through, numerous routers (herein routers are meant to include both network routers and switches) in order to arrive at the desired destination.

The backhaul point 10 may be coupled to each phase of the MV power line. In practice, however, this may not be necessary. In some embodiments, such as those communicating through overhead MV conductors, data signals may couple across the MV conductors. In other words, data signals transmitted on one MV phase conductor may be present on all of the MV phase conductors due to the data coupling between the conductors. As a result, the backhaul point 10 may not need to be physically connected to all three phase conductors of the MV power line and transmission from the backhaul point 10 when coupled to one MV phase conductor will be received by the BDs 100 connected to the other MV phase conductors and vice versa. In some embodiments, however, which may include underground MV power cables, it may be desirable to couple the backhaul point 10 to all of the available phase conductors.

A detailed description of an example PLCS and its network elements with which the present invention may be used is provided in U.S. patent application Ser. No. 10/641,689 filed Aug. 14, 2003, entitled "Power Line Communication System and Method of Operating the Same," which is hereby incorporated by reference in its entirety. A detailed description of another example PLCS, and its network elements is provided in U.S. patent application Ser. No. 10/973,493 filed Oct. 26, 2004, entitled "Power Line Communications System and Method of Operating the Same," which is hereby incorporated by reference in its entirety. The network planning methods of the present invention may be used to plan networks as described in the above patent applications. Thus, while the present invention may be suitable for planning the overhead portion of a power line communications system the invention may also be used for planning the underground portions of a PLCS and is not limited to planning a particular PLCS, PLCS architecture, or topology. For example, the present invention may be used to plan the layout of a network in which communication device are coupled to an MV power line conductor and communicate with user devices via low voltage power lines, coaxial cables, a fiber optic cables, twisted pair conductors, or via wireless links (e.g., IEEE 802.11 links). The following example embodiments of the present invention are for use in planning the overhead portion of the PLCS network.

As discussed, it is important to design the PLCS network to efficiently utilize the PLCS network equipment and to minimize ancillary network costs such as backhaul link costs. In the above example PLCS, the backhaul point 10 is connected to the AP 20 via a non-power line backhaul link, which may be, for example, fiber optic cable, a wireless network, or other suitable medium. Typically, fiber optic cables, wireless networks, and/or other backhaul media may be available throughout the area in which the PLCS is installed, but is not available everywhere in the area of installation. Consequently, generally it is economically advantageous to design the network to make use of existing backhaul media and to reduce the need to install additional backhaul media, which can be very expensive. Thus, it may be desirable to install backhaul points at or near existing backhaul media (e.g., fiber optic cables or wireless networks).

The network planner also may desire, or be required, to provide PLC services to the entire electrical distribution network. Thus, generally it is also desirable to install backhaul points and other network elements (e.g., repeaters and bypass devices) so as to minimize or reduce the number of backhaul points necessary to provide the desired PLC service. In some instances, the need to minimize or reduce the number backhaul points can be adverse to the need to place backhaul points at or near backhaul media.

In an example PLCS with which the present invention may be used, the communications signal is transmitted over a MV power line segment by a first communications device, such as a backhaul point, repeater, or bypass device, with a known power level, which may be set by certain government regulations. In order for a second power line communications device, such as a backhaul point, repeater, or bypass device, to reliably and intelligibly receive the communications signal, the received signal must have a signal to noise ratio (SNR) greater than a certain threshold level. Noise levels for power lines may be determined from measurements or other means. Thus, knowing the transmission power level and the threshold SNR level, it is possible to determine a link budget (i.e., maximum power loss) for signals transmitted between two PLC devices (such as between a backhaul point and a particular bypass device) that permits reliable communications. The link budget for each communication link (i.e., a power line segment between two PLC devices) may be compared to the estimated or anticipated attenuation for the communication link to determine if reliable communications are likely to be experienced by the two devices. In practice, the link budget may include a margin of error to ensure that the designed network functions at desired performance levels.

Figure 3:
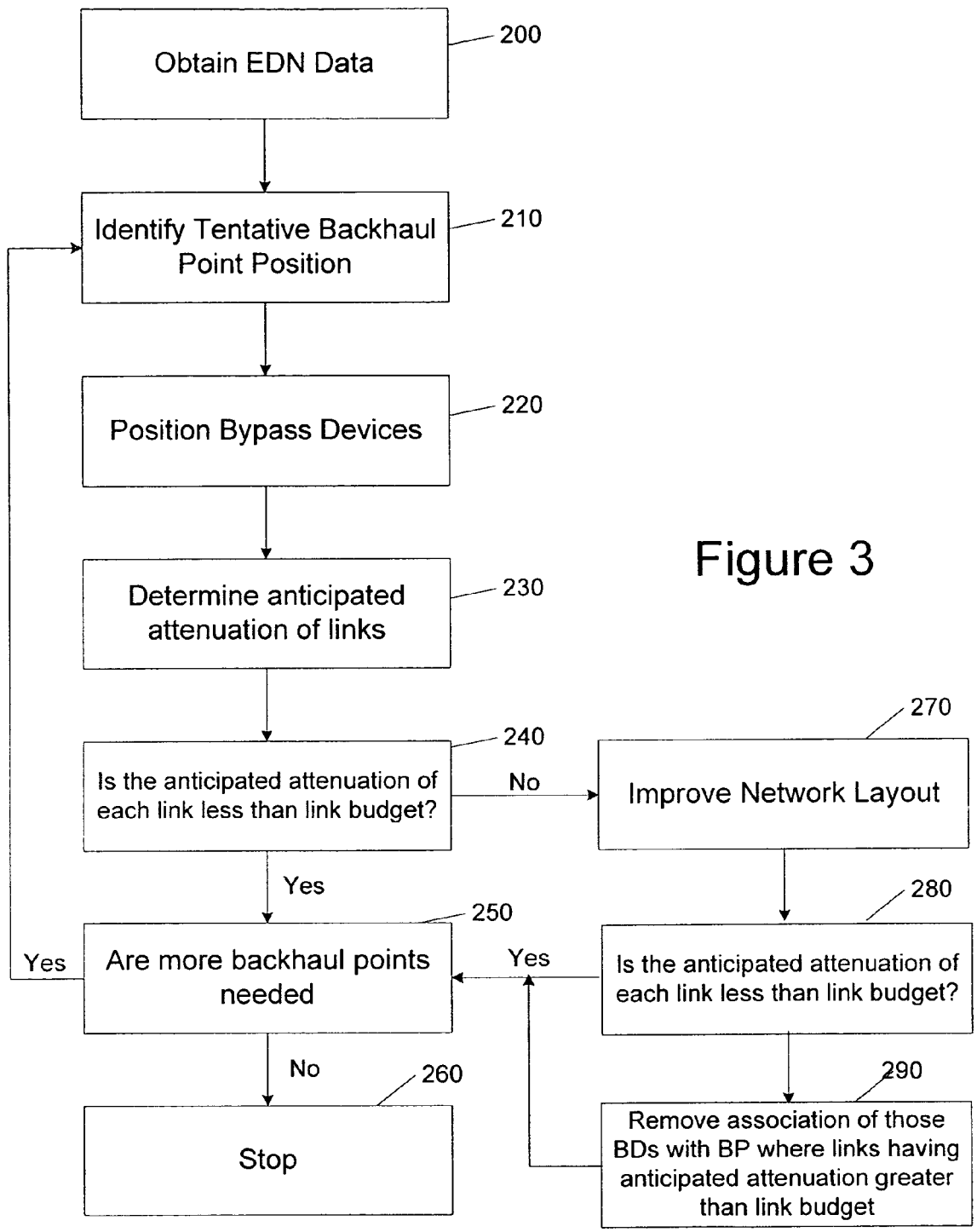
FIG. 3 is a flow diagram showing a PLCS network planning process according to an example embodiment of the present invention.

FIG. 3 is a flow diagram showing a PLCS network planning process according to an example embodiment of the present invention. In one example embodiment, the process may be implemented via a computer system having a memory (volatile and nonvolatile) that includes computer readable medium with executable program code encoded therein. First, electric distribution network (EDN) data is obtained 200. Next, a position for a first backhaul point (BP) for servicing a first PLCS subnet is tentatively determined. Bypass devices are then positioned 220 for each distribution transformer and generally near the backhaul point. Next, the anticipated attenuation of the link between each bypass device and the backhaul point is determined 230. Next, the anticipated attenuation at each link is compared to the link budget 240. If the anticipated attenuation of each link associated with each bypass device is less than the link budget for then the layout for that PLCS subnet is complete. It is then determined if more back haul points (i.e., more PLCS subnets) are needed 250. If so, then the process returns back to tentatively positioning a backhaul point at step 210 and the process repeats again. If no additional backhaul points are needed at 250 (i.e., the network is completely planned), then the process ends 260. Returning to step 240, if the anticipated attenuation of any link associated with any bypass device is not less then the link budget, then the network layout is improved, if possible, using, for example, phase coupling, a lower loss coupler, or another method 270. Next, the anticipated attenuation of at least some of the communication links after improvement is again compared to the link budget 280. As before, if the anticipated attenuation of all link is less than the link budget, then the bypass devices are "associated" with the backhaul point(e.g., information may be stored in memory to indicate that the bypass devices will communicate with the backhaul point), the PLCS subnet layout process is complete and it is determined if another backhaul point is needed 250. Otherwise, those bypass devices having associated communication links having anticipated attenuations greater than the link budget are removed from association with the backhaul point of the current PLCS subnet 290 and may eventually be associated with another BP and form part of a different PLCS subnet. The process then proceeds to step 250 to determine if another backhaul point is needed. Each of these steps are now described in further detail below. Once the network layout for a PLCS subnet is complete, the information may be stored in memory.

The first step of a method according to an example embodiment of the present invention includes obtaining EDN data as shown in step 200 of FIG. 3. Such information may be used to select tentative placement of PLC device and to determine anticipated attenuation of communication links.

In this embodiment various EDN data is needed in order to plan a PLCS network, such as the power line network topology, the location of power line poles and equipment, the loss characteristics of the various installed equipment and power line features, and the loss characteristics of the power lines to be used in the PLCS network. Specifically, and depending on the embodiment, this EDN data may include, for example, the distance between each utility pole, the equipment at each utility pole, the number of phase conductors of MV power line segments, the identity and location of features along the MV power line segments, and other such information. Further, the type and model of the equipment on the power lines may be needed to determine the attenuation associated therewith. Additionally, information of the type of power line cable used along the MV power lines may be included. Each type of cable, feature, equipment, etc. may have different attenuation characteristics associated therewith, which may be stored in a database along with the type of feature, equipment, location, and other data discussed herein. In addition, information regarding the location of backhaul media that may be connected to the PLCS (e.g., a backhaul point 10) also may be obtained.

EDN data for the PLCS may be obtained from the utility. For example, the information may stored in a database or may be determined from information (longitude and latitude information) stored in a database. If this data is not readily available, a line survey may be performed to gather this information, which may include a physical inspection of the selected area of the EDN and review of telecommunication and utility information (e.g., maps).

In this embodiment, the next step of designing a PLCS network (that uses the components described above and shown in FIG. 2) is determining a tentative position for the backhaul point as shown as step 210 in FIG. 3. This position is referred to as a "tentative" position because, in some embodiments, the position of the backhaul point may be changed. Backhaul points are connected to an aggregation point or other upstream device. This may be done in different ways as described above, but the use of optical fiber and wireless links are two methods because of their availability and high bandwidth capability. Generally, it preferable to locate the backhaul point so as to minimize or reduce the cost of backhaul media (e.g., fiber or wireless network). Thus, for many installations the position of the BP may be largely driven by availability of backhaul media. If there is some flexibility in positioning the BP, the BP may be positioned to minimize or reduce the cumulative attenuation of the MV power line between the BP and its bypass devices.

Figure 4A:
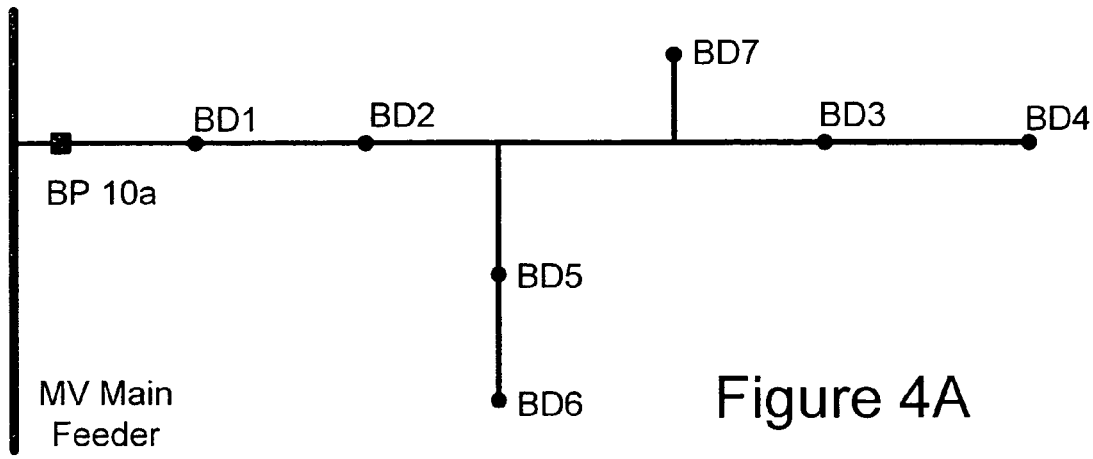
FIGS. 4A and 4B show examples of portions of a PLCS network according to the present invention.
Figure 4B:
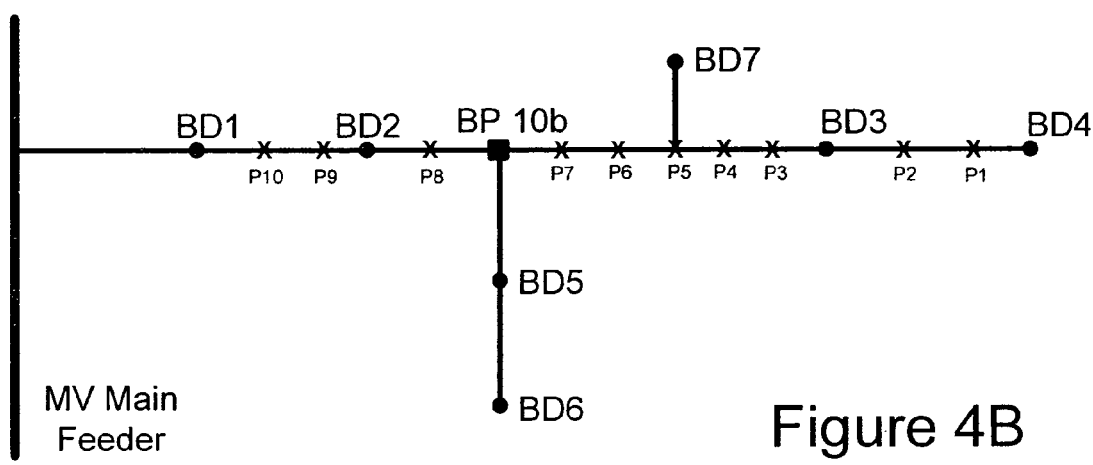

For example, FIGS. 4A and 4B show an MV branch off of an MV main feeder line. FIGS. 4A and 4B show examples of portions of a PLCS network according to the present invention. In FIG. 4A the backhaul point BP 10a is placed near the MV main feeder. In this case there are a number of bypass devices such as, for example, BD3, BD4, BD7, and BD6 that are a significant distance from the backhaul point BP 10a. In FIG. 4B the backhaul point BP 10b is placed near the center of the MV branch. In this case BD1 and BD4 are the farthest bypass devices from the backhaul point BP 10b, which distances are less than the farthest bypass devices in FIG. 4A. FIG. 4B illustrates that it may be better to place the backhaul point BP in the center of a branch rather than at the edge of the branch as shown in FIG. 4A resulting in a lower total attenuation between the BP and its bypass devices along the MV line. Further, with other facts being equal, it is generally desirable to place the backhaul points so that they may communicate with as many as possible bypass devices as possible. Thus, if the backhaul point BP 10a of FIG. 4a is unable to reliably communicate with all its bypass devices, the positioning may be better accomplished by the configuration in FIG. 4B. However, if the BP 10a of FIG. 4a can communicate with all the bypass devices in the figure, and backhaul media was readily available at the location of BP 10a (and not 10b), FIG. 4a may be the more desirable location of the BP.

A backhaul point has a maximum data rate that could limit the number of bypass devices to which the backhaul point could reliably service. So in some instances, maximizing the number of bypass device with which the BP can communicate may not be factor of consideration. For example, if a backhaul point could only service four bypass devices (due to data rate considerations), there would be little benefit in positioning a BP to communicate with more than four bypass devices. Finally, in one example embodiment, if three MV power line conductors are present, the BP is positioned to be coupled to the middle conductor.

After a tentative position of the BP is identified, positions of its bypass devices are identified as shown in step 220 of FIG. 3. Typically, bypass devices are positioned at all distribution transformers within a certain distance from the backhaul point and often in both directions along the MV power line. This distance may be based on the anticipated attenuation along the MV line. However, it may be desirable reduce the distance by a number of utility poles, transformers, or a percentage to build in a margin of error to overcome imprecise estimates in the anticipated attenuation of the link. Typically bypass devices are placed right at the distribution transformer. There are situations, for example on certain overhead poles, where this may not be possible. Therefore the bypass device 100 may be placed on a pole or at another location where there is no transformer. Finally, in one example embodiment, if three MV power line conductors are present, the bypass devices may be positioned to be coupled to the middle conductor, to the MV conductor to which the transformer is connected, or to any other phase conductor.

Next, the anticipated attenuation of the communication links between each bypass device and the backhaul point is determined as in step 230 of FIG. 3. Other embodiments for use with other PLCS may additionally position and compute anticipated attenuation for repeaters and other PLC devices that need to be installed.

Generally, there are three different contributors to the attenuation of each communication link, which are line attenuation, equipment attenuation, and EDN feature attenuation. It is worth noting that while the word "attenuation" is used throughout this description, it is meant to include loss of power of a signal through attenuation, dissipation, radiation and any other means. Through historic measurements and/or other means, each of these contributors can be determined or estimated and modeled to determine if a planned PLCS design will enable reliable communications between its devices. Specifically, each of these attenuation contributors may be aggregated to determine an anticipated attenuation that can be used to determine if two PLC devices can communicate with each if positioned at a particular location.

As discussed, power line attenuation is one type of attenuation that contributes to power loss signals communicated over power lines. Power line conductors typically are very lossy at frequencies of power line communications. Power line attenuation typically is based upon an attenuation per distance of the MV power line conductor. The distance along the MV power line conductor between two devices may be used to determine the line attenuation for the communication link between them. Thus, the distances of the communication links (i.e., the distance between two tentative PLC device positions) may be determined from data retrieved from a database or determined from the line survey data (discussed below), or any suitable means.

If all of the MV power line segments have the same attenuation per distance, line attenuation may be computed by multiplying the distance of the link by the attenuation per distance to obtain the line attenuation of the link. If there are MV power line segments with different attenuations that form part of a link, then the calculation needs to be done for each segment and then aggregated.

MV power lines may include one, two, three or more phase conductors. It has been discovered that a single MV power line phase conductor typically will have a different attenuation per distance than a power line conductor forming part of a multi-conductor MV power line MV segment. In addition, if there is more than one MV power line conductor, the conductors typically will be spaced apart and in parallel with each other. As a result, the proximity of the multiple conductors to each other may influence the attenuation per distance. Thus, a MV power line conductor may be modeled differently depending on the presence and configuration of other nearby conductors.

As discussed, equipment attenuation is another cause of attenuation of signals on a communication link. Various types of EDN equipment may be found on the power network. Examples include transformers, insulators, cut-outs, capacitor banks, regulators, switch banks, repeaters, bypass devices, backhaul points, and switch bank with arrestors. For a given type of equipment, the attenuation may vary based upon the manufacturer and/or model of the equipment, installation practice, and the type of MV power line segment (e.g., one phase conductor versus two). This equipment attenuation information may be retrieved from a database or gathered as part of a line survey. The equipment attenuation for a communication link is determined by summing the attenuation contributed by each piece of equipment along the link between the two devices and, generally, that is connected to the power line conductor.

As stated above, various EDN features may result in attenuation of a communication signal traversing the power line communication link. Power line features include branches (e.g., two way, three way, and four way branches may each be modeled differently), taps (e.g., one way and two way), URD taps, bends, camelback junctions, the end of a power line, and other power line features. The attenuation due to the power line features of a communication link may be determined by summing the attenuation contributed by each feature along the link. The locations of such features may determined by the line survey, be retrieved from a database, and/or by other suitable means.

The line attenuation, equipment attenuation, and EDN feature attenuation are summed to provide an anticipated attenuation of the communication link, which, as discussed above, may provide the anticipated loss of power of a communication signal transmitted along the link (e.g., between a backhaul point and a bypass device). This anticipated attenuation may be calculated for the link associated with each pair of devices that need to communicate with each other in the given PLCS such as between each bypass device and the BP, between each repeater and the BP, and between each repeater and the bypass devices for which it repeats.

In addition, the anticipated attenuation of a MV power line segment may be computed for each MV power line phase conductor. As discussed, each MV power line phase conductor may include different power line features and different equipment attached thereto. Thus, it may be desirable to identify the MV power line phase conductor to which a BP or a BD should be connected by determining the phase that has the lowest anticipated attenuation over the communication link (i.e., that phase conductor).

After computing the anticipated attenuation of each communication link between each bypass device and the BP, it is determined if any of the anticipated attenuation of any links is greater than the link budget as in step 240 of FIG. 3. As discussed, the link budget typically is known and dependent on the power of transmitted signals and the noise floor. While the link budget may be the same for all devices, in some embodiments different devices may transmit with a different power level or have a different noise floor, and therefore, have a different link budget.

If none of the communication links have anticipated attenuation values that exceed the link budget, then network layout for that PLCS subnet may be complete (as in step 250 of FIG. 3): i.e., is another backhaul point need? If the network layout is complete then the process is stopped 260. If the network layout is not complete, then another backhaul point is placed as in step 210, and the process continues again. Alternately, if none of the bypass devices have anticipated attenuations values that exceed the link budget, then additional bypass devices may be positioned and associated with the backhaul device of the PLCS subnet. The process then may return to step 230 and continue.

If the anticipated attenuation values for one of more of the communication links exceeds the link budget, then the network layout may be improved at 270. Two example improvements include changing conductor coupling or employing a lower loss coupler.

When the MV power lines segment include multiple phase conductors, the communication signals coupled on one phase will couple to the nearby conductors. While only a portion of the energy of a communication signal transmitted on one phase will couple to an adjacent phase conductor, typically there will be sufficient power coupled so that bypass devices that are close to the backhaul point 10 are placed on adjacent phase conductors still receive the signals with sufficient SNR to permit the devices to communicate reliably. The link between two devices on separate phase conductors may also include a phase coupling attenuation in its anticipated attenuation.

Figure 5:
FIG. 5 shows the layout of a backhaul point and bypass devices on a three phase set of MV power lines according to the present invention.

Bypass devices and other devices connected to a power line phase conductor generally have a through loss associated with them. FIG. 5 shows the layout of a backhaul point and bypass devices on a three MV power line conductors according to an example embodiment of the present invention. As shown in FIG. 5, by coupling the closer bypass devices BD1 and BD2 to adjacent phase conductors, the through loss associated with those bypass devices may be largely removed from communication links of bypass devices BD3 and BD4. This reduction in attenuation may result in a communication link that had too much attenuation subsequently having a lower attenuation and thereby being sufficient to provide reliable communications for the devices. Thus, one form of improving the network layout 270 is by coupling a PLC device, such as devices near a BP, to a different phase conductor so that its through loss does not impact downstream devices on the original phase conductor. In alternate method, the BP may be coupled to a different phase conductor than nearby PLC devices In still another embodiment, the bypass devices closer to the BP may be coupled to a neutral conductor (even if the BP is coupled to the MV phase conductor).

Another method of improving the network layout includes employing a different coupler with one or more of the PLC devices. Various couplers are described in the following patent application numbers: U.S. application Ser. No. 10/075,332 filed Feb. 14, 2002, entitled "Data Communication Over a Power Line", now U.S. Pat. No. 7,414,518; U.S. application Ser. No. 10/292,714 filed Nov. 12, 2002, entitled "Power Line Coupling Device and Method of Using the Same"; now U.S. Pat. No. 6,982,611; U.S. application Ser. No. 10/348,164 filed Jan. 31, 2003, entitled "Power Line Coupling Device and Method of Using the Same"; now U.S. Pat. 7,046,124; and U.S. application Ser. No. 10/947,929 filed Sep. 23, 2004, entitled "Power Line Coupling Device and Method of Using the Same", now U.S. Pat. No. 7,245,201, which are all fully incorporated herein by reference. A coupler will have a through loss and an insertion loss that are often related. Specifically, couplers with a high through loss typically have a lower insertion loss and vice versa. A coupler with a choke described in the incorporated reference has good coupling performance. If the choke is removed the coupler (chokeless coupler) performance is reduced (i.e., the insertion loss is increased), but the through loss (and impact on downstream devices) is reduced. Therefore, the chokeless coupler may be used with bypass devices that are closer to the BP and where the SNR is high to reduce the attenuation of the communication link associated with bypass devices further from the backhaul point. Thus, this method of improving the network layout may be used even if there is only one MV power line phase conductor.

The PLCS network layout may be improved, if possible, using either or both of changing conductor coupling or using alternate couplers. If both types of improvements are available, then the improvement that reduces the anticipated attenuation the greatest may be used first. For example, if changing conductor coupling results in greater reduction of anticipated attenuation then it may be used first. For example, this may include selecting an MV power line segment to improve and then positioning the nearest bypass device(s) to a second phase conductor (i.e., a coupled phase conductor). Next, the anticipated attenuation may be recalculated for the downstream devices (e.g., bypass devices and repeaters). Next, additional second nearest bypass devices may be moved to a third phase conductor (i.e., another coupled phase conductor) if available or to the second phase conductor if no third phase conductor is available. The moving of further and further bypass devices to other phase conductors may continue until either all of the devices on the branch have acceptable anticipated attenuations or until changed devices would no longer have acceptable anticipated attenuations. If further improvement is necessary or desirable, the remaining nearest bypass devices on the first phase conductor may be modeled with low loss couplers until either all of the communication links on the branch have acceptable anticipated attenuations or until further changes in couplers results in links having unacceptable anticipated attenuations. Other variations of improving the layout may also be carried out depending on the type of coupler, the topology of the PLCS, and the PLC devices employed, and/or other factors. Such improvements result in more bypass devices per backhaul point, which may result in fewer backhaul points needed in the PLCS, thus reducing the cost of the backhaul media and the system.

After making the improvements, it is determined if any of the anticipated attenuation values for the links exceed the link budget at step 28. If not then the process proceeds to step 250 as described above. If so, then the bypass devices that have anticipated attenuation above the link budget will be removed from the PLCS subnet of the backhaul point 290 (e.g., that bypass device may be modeled for communications with a different BP). Those with anticipated attenuations less than the link budget will be associated with the backhaul point and installation will proceed according to the final model. The process then proceeds to step 250 as described above. In an alternate embodiment if it is not possible to improve the network so that all communication links have anticipated attenuations that are less than the link budget, one or more of the bypass device may need to be serviced via a different backhaul point (and associated with a different backhaul point) and/or a different position may need to be selected for the tentative position of the backhaul point.

In one embodiment, the present invention is comprised of computer encoded media executable by a general purpose computer to perform the steps for planning the PLCS network. For example, the EDN data may be collected and stored in databases. Mapping software may be used to map out the location of poles, equipment, transformers etc. and to display that to a network designer. Further, the location of external communications networks used to communicate data between the backhaul points and upstream devices such as, for example, either an aggregation point or a POP may be shown on the map. Specifically existing access points to backhaul media may be shown as well as the distance between the backhaul media and distribution transformers. A network designer may view the map of the area where a PLCS network is to be built to determine how the EDN is laid out relative to the existing communication networks that will provide the backhaul links. Next, the software may place bypass devices at all distribution transformers. As needed, the designer or the software may identify distribution transformers where there is not sufficient space to install a bypass device. Such information also may be stored in the database. In such a scenario, the bypass device may be positioned at a nearby location (e.g., at the adjacent utility pole) where both the MV and LV power lines serviced by the distribution transformer may be accessed. Next the network designer (or software) may begin positioning backhaul points, for example, in a sequential fashion and based on distance to the backhaul media. The software may enable the network designer to position BPs by simply receiving (from the designer) an indication on the map of the location where the backhaul point is to be positioned. When tentative backhaul point positioning information is received from the user or determined by the software, the software may calculate the anticipated attenuation between the tentative backhaul point position and all the bypass devices positions within a given circumference, area, number of poles, or distance on the MV power lines. Typically, this calculation is done for bypass devices positions further and further from the backhaul point position until the anticipated attenuation values meet the link budget. Also, different visual indications may be used, such as the color or shape of the symbol for a bypass device, to indicate whether the anticipated attenuation of the link for the bypass device position is less than or greater than the link budget. If possible, at this point the designer and/or software make improvements to the network design as described above to allow the backhaul point position to service more bypass devices or to better service the bypass devices (e.g., to provide higher data rates between the backhaul point and its bypass devices). Then, the next backhaul point may be positioned and the process repeated until all of the necessary bypass devices are associated with backhaul points.

Typically, the power line networks are arranged as branches off main MV feed power lines. One method of positioning a backhaul point is to determine the greatest distance from the end of an MV power line where the backhaul can be placed to still service a bypass device at the end of the power line. For example, and referring to FIG. 4B, if the link budget for the communication links is 50 dB, this method may include determining the farthest pole or transformer from the end of the MV power line (BD4) for which the link would result in less an anticipated attenuation of than 50 dB. In this example, if the anticipated attenuation between utility pole P8 and the location of BD4 is 55 dB, the backhaul point could not reliably communicate with BD4. If however, the anticipated attenuation between BD4 and at the location of BP 10*b* is 45 dB, the BP 10*b* can be positioned as shown.

Figure 6:
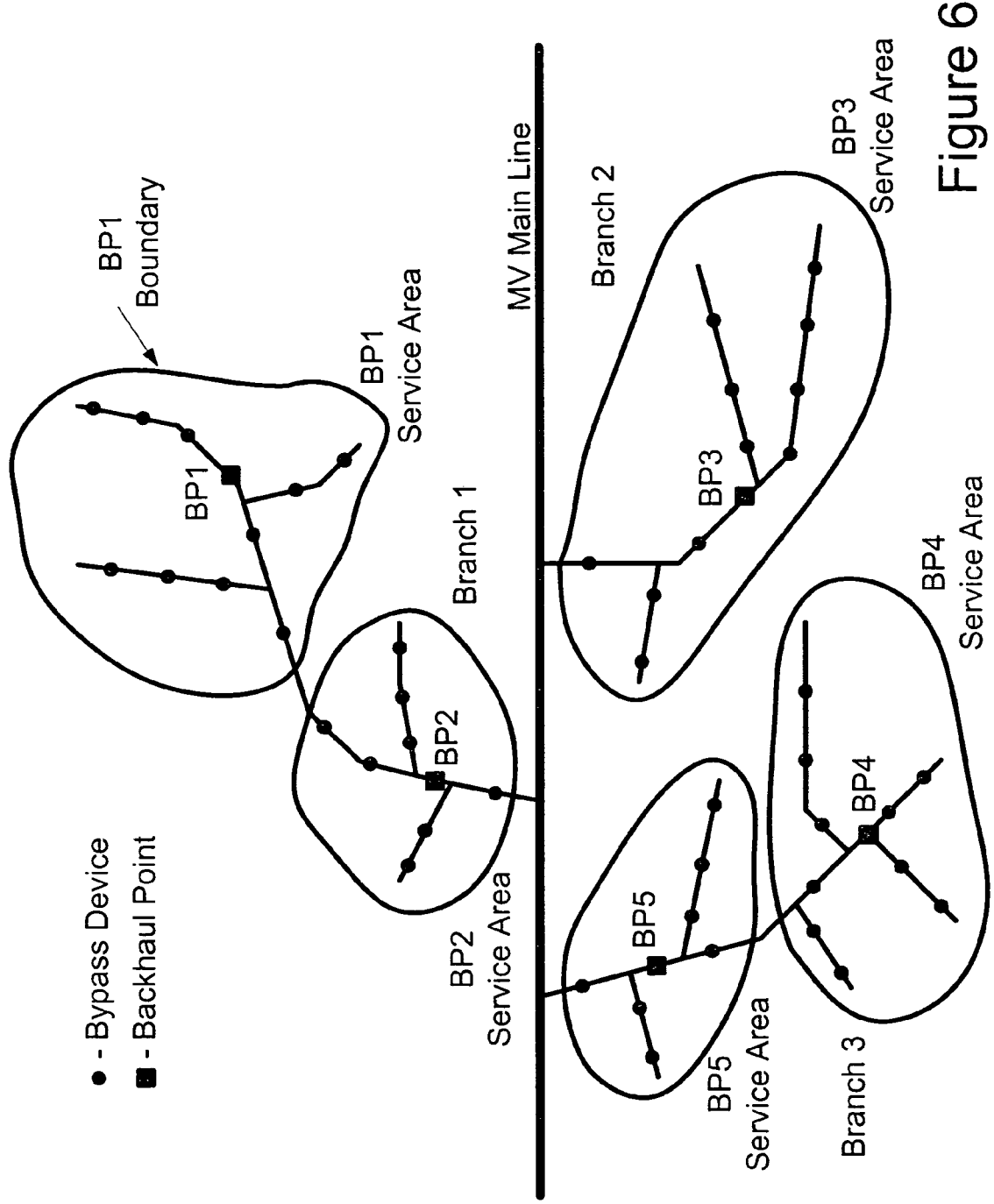
FIG. 6 shows a layout of a medium voltage power line network according the present invention.

FIG. 6 illustrates a layout of a MV power line network design according the present invention. It includes three branches labeled Branch 1, Branch 2, and Branch 3. A first backhaul point BP1 is positioned according to the method described and is able to communicate with the bypass devices within the BP1 boundary shown. The next backhaul point BP2 may then be placed further along the branch towards the main line as shown. BP2 communicates with the bypass devices within the boundary shown. Next, Branch 2 may be laid out. In this case a single backhaul point BP3 serves the whole branch. This branch may be able to be served by a single backhaul point. Finally Branch 3 is laid out in a manner similar to branch 1 using two backhaul points BP4 and BP5 as shown.

The use of software on a computer allows the designer to quickly layout a network and quickly make adjustments. For example, in one embodiment the software allows the designer to move the backhaul points around and indicates the bypass devices that can be serviced from each location of the BP. The software may also calculate various cost and performance parameters. The cost of equipment may be known and stored the database. In addition, the cost of providing backhaul media to the tentative location of the backhaul point also may be estimated by the software (e.g., based on a cost per foot of distance between the tentative position and existing backhaul media and or may be fixed) and presented to the designer. Average, median, and maximum anticipated attenuations may be calculated, stored, and presented to the user/network planner. Other parameters such as the number of bypass devices per backhaul point, the number of end users per backhaul device, the number of homes passed per backhaul point, and cost per home passed may also be computed and presented to the user. These measures and/or others may be used to improve or determine the quality of a network design. Such information may allow the network planner to determine whether larger business objectives, such as economical goals, can be met in a geographical area. Also the software may allow the designer to develop various network designs and to store them in memory to allow the designer to compare them to determine the desired design based upon the various performance and/or cost parameters. Alternately, multiple layouts may be stored and compared by the software which may visually present cost and/or performance comparisons of the layouts including but not limited to the number of bypass devices per backhaul point, the number of end users per backhaul device; the number of homes passed per backhaul point; average, minimum, maximum, and mean anticipated data rates for users; and the cost per home passed. Additionally, the network designer may develop various designs until a design satisfying certain performance and/or cost criteria is achieved.

Thus, the software of one embodiment may also fully automate the network layout process. For example, the area where a network is to be built is identified and associated EDN data is provided to the software. The software may then analyze the network and potential backhaul point positions and bypass devices as described above. Then performance and cost values may then be calculated. If the resulting design has acceptable performance and cost the design may be accepted, otherwise the design may be modified to further reduce cost and/or increase network performance until it satisfies acceptance criteria for cost and/or performance. Also, the software may develop a number of different designs and select the best based upon cost and performance parameters. Furthermore, in one embodiment the software may determine all possible layouts for a given area, and then select the best design. In order to limit the number of possible designs, a limit might be placed on how close backhaul points may be place to one another. This automated approach also may identify various branches in the power line network and proceed to move from the ends of those branches towards the base of the branches or toward the center of the network.

Repeaters may also be used in planning a PLCS network. Typically a repeater on the MV lines would take an MV signal and then repeat it at a different frequency along the MV line. In some instances, this may reduce the total bandwidth available to any given bypass device, but there are situations were this is an acceptable tradeoff. The repeaters may be used to extend the reach of a backhaul point and reduce the need to add additional backhaul media. For example, a repeater could be used to allow a single backhaul point to service a branch of an MV network instead of using two backhaul points. Repeaters may also be implemented in and form part of a bypass device, so that in some PLCS a bypass device may be function as a repeater as well. Such functionality is implemented in software in the bypass device.

In the process described in FIG. 3 prior to step 250 where it is decided to place additional backhaul points, an alternate embodiment may include a step to determine if a repeater should be tentatively positioned based upon the criteria such as those described above. If so, then the repeater could be positioned, and additional bypass devices would then be placed and associated with the repeater and the backhaul point in communication with the repeater.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended Those skilled in the art, having the benefit of the teachings of this specification, may affect numerous modifications thereto and changes may be made without departing from the scope and spirit of the invention.

What is claimed is:

1. A method of using a computer system to design a power line communication system, comprising:
    using the computer system to perform at least the steps of:
    identifying a position of a first communications device on a medium voltage (MV) power line;
    identifying positions for a plurality of second communications devices on the medium voltage power line that are configured to communicate with the first communications device;
    outputting on a map the positions identified for the first communications device and the plurality of second communications devices;
    determining an anticipated attenuation for each communication link associated with at least some of the plurality of second communications devices at each of their respective positions for communicating with the first communications device;
    comparing the anticipated attenuation for each of said communication links with a link budget value;
    outputting a notification that identifies any of said communication links having an anticipated attenuation greater than the link budget value; and
    wherein said identifying a position of a first communications device, said identifying positions for a plurality of second communications devices, said determining, and said comparing are performed prior to an installation of said first communications device and prior to an installation of the plurality of second communications devices.

2. The method of claim 1 wherein the medium voltage power line includes at least a first and second parallel power line conductor, the method further comprising:
    identifying a parallel power line conductor to which at least some of the second communication devices are to be installed.

3. The method of claim 2, further comprising:
    determining that the anticipated attenuation is greater than the link budget value for a communication link associated with an identified second communications device; and
    identifying a different parallel power line conductor to which the identified second communications device is to be installed.

4. The method of claim 1, further comprising:
    determining that the anticipated attenuation is greater than the link budget value for a communication link associated with an identified second communications device; and
    identifying a new position for the identified second communications device.

5. The method of claim 2, further comprising modeling one of the plurality of second communications devices with a coupler having a lower through loss than other of the second communications devices.

6. The method of claim 2, further comprising changing the parallel power line conductor to which one of the second communications devices is to be installed and modeling a second of the second communications devices with a coupler having a lower through loss than at least some of the other of the plurality of the second communications devices.

7. The method of claim 1, further comprising associating the second communications devices having a link with an anticipated attenuation that is less than the link budget with the first communications device.

8. The method of claim 2, further comprising associating the second communications devices having a link with an anticipated attenuation that is less than the link budget with the first communications device.

9. The method of claim 1, wherein determining the anticipated attenuation comprises determining a power line attenuation of the communication link.

10. The method of claim 1, wherein determining the anticipated attenuation comprises determining attenuation due to equipment along the communication link.

11. The method of claim 1, wherein determining the anticipated attenuation comprises determining attenuation due to power line features along the communication link.

12. The method of claim 1, wherein determining the anticipated attenuation comprises determining the attenuation due to power line attenuation and equipment attenuation along the communication link.

13. The method of claim 1, wherein determining the anticipated attenuation comprises determining the attenuation due to power line attenuation, equipment attenuation, and power line feature attenuation along the communication link.

14. The method of claim 1, wherein the first communications device comprises a backhaul point, the method further comprising determining if additional backhaul points need to be positioned.

15. The method of claim 1, further comprising identifying a position of a repeater on the medium voltage power line.

16. The method of claim 1, wherein the position identified for the first communications device comprises a tentative position.

17. The method of claim 1, further comprising identifying a second position for at least one of the second communications device if the anticipated attenuation of the communication link associated with the at least one second communications device is greater than the link budget value.

18. The method of claim 1, further comprising identifying a position of a repeater on the MV power line if the anticipated attenuation of at least one of the communication links is greater than the link budget value.

19. The method of claim 1, further comprising upon determining that the anticipated attenuation is less than the link budget value for each of the communication links, installing the first communications device and the second communications devices at their respective identified positions.

20. The method of claim 1, wherein the positions identified for the plurality of second communications devices are at distribution transformers within a predetermined distance of the position identified for the first communications device.

21. The method of claim 20, wherein the distance is based upon the attenuation characteristics of the MV power line and the link budget.

22. The method of claim 1, wherein the identifying of the position of the first communications device comprises determining the position based on a cost of installing the first communications device at the position on the power line.

23. The method of claim 22, wherein the cost of installing the first communications device includes the cost to provide backhaul media at the identified position.

24. The method of claim 1, wherein said identifying a position of a first communications device comprises receiving a first input from a user; and
wherein said identifying positions for a plurality of second communications devices comprises receiving one or more second inputs from a user.

25. The method of claim 1, wherein said outputting a notification comprises displaying a notification on the map that indicates any of said communication links having an anticipated attenuation greater than the link budget value.

26. A method of using a computer system to design a network layout for a power line communication system, comprising:
using the computer system to perform at least the steps of:
identifying a first position of a first communications device on a medium voltage power line segment;
identifying a second position for a second communications device on the medium voltage power line segment for communications with the first communications device;
outputting on a map the identified first position for the first communications device and the identified second position for the second communications device;
estimating an attenuation for a first communication link between the first communications device and the second communications device;
comparing the estimated attenuation with a link budget value for the first communication link;
wherein said identifying a position of a first communications device, said identifying a position for a second communications device, said estimating, and said determining are performed prior to installation of either the first or second communications device; and
if the attenuation of the first communication link is greater than the link budget value, outputting a notification that indicates that the attenuation of the first communication link is greater than the link budget value.

27. The method of claim 26, further comprising:
estimating an attenuation for a second communication link between the first communications device and the second communications device; and
wherein the first communication link and the second communications link include at least one different power line phase conductor.

28. The method of claim 26, further comprising:
comparing the estimated attenuation of the first communication link with the estimated attenuation of a second communication link; and
coupling the first communications device and the second communications device to phase conductors according the first or second communications link having the lowest estimated attenuation.

29. The method of claim 26, wherein the medium voltage power line includes at least a first and second parallel power line conductor at the second position, the method further comprising:
identifying the parallel power line conductor present at the second position to which the second communications device is to be coupled.

30. The method of claim 26, wherein identifying a first position of a first communications device comprises determining the first position based on a cost of installing the first communications device at the first position on the power line.

31. The method of claim 30, wherein the cost of installing the first communications device includes the cost to provide backhaul media to the first position.

32. The method of claim 26, wherein said identifying a first position comprises receiving a first input from a user; and
identifying a second position comprises receiving a second input from a user.

33. The method of claim 26, wherein said outputting a notification comprises displaying a notification on the map that indicates that the attenuation of the first communication link is greater than the link budget value.

34. A method of using a computer to design a power line communication system, comprising:
  displaying a map of an area on a display;
  displaying medium voltage power lines on the map;
  displaying the location of distribution transformers on the map;
  positioning one or more bypass devices on the map corresponding to distribution transformers,
  displaying an icon on the map representing each bypass device positioned;
  positioning a backhaul point on the medium voltage power lines;
  displaying an icon on the map representing the backhaul point corresponding the position of the backhaul point;
  determining an attenuation for a link associated with each bypass device for communications with the backhaul point;
  comparing each attenuation to a link budget value; and
  providing a visual indication on the display to indicate bypass devices having an associated link with an attenuation that is less than the link budget value.

35. The method of claim 34, further comprising receiving a user input and wherein positioning bypass devices on the map is based on the user input.

36. The method of claim 34, wherein determining the attenuation includes determining power line attenuation along the link associated with each bypass for communications with the backhaul point.

37. The method of claim 34, wherein determining the attenuation includes determining equipment attenuation along the link associated with each bypass for communications with the backhaul point.

38. The method of claim 34, wherein determining the attenuation includes determining power line feature attenuation along the link associated with each bypass for communications with the backhaul point.

39. The method of claim 34, further comprising providing a visual indication on the display to indicate bypass devices having an associated link having an attenuation that is greater than the link budget value.

40. The method of claim 34, wherein the medium voltage power line includes at least a first and second parallel power line conductor, the method further comprising:
  identifying a parallel power line conductor to which at least some of the bypass devices are to be installed when multiple parallel power line conductors are present at the location identified for the bypass devices; and
  identifying a parallel power line conductor to which the backhaul point is to be installed; and
  wherein the power line to which the backhaul point and at least some of the bypass devices are to be installed is different.

41. The method of claim 40, further comprising determining that the attenuation for a first link is greater than the link budget value for the first link associated with a first bypass device; and
  identifying a different parallel power line conductor to which first bypass device is to be installed.

42. The method of claim 41, further comprising changing the position of the backhaul point.

43. The method of claim 34, wherein determining the attenuation comprises determining the attenuation due to power line attenuation, equipment attenuation, and power line feature attenuation along the link associated with each bypass for communications with the backhaul point.

44. The method of claim 34, further comprising changing the position for the backhaul point if the attenuation of a link is greater than the link budget value for at least one link.

45. The method of claim 34, further comprising positioning a repeater on the map if the attenuation of a link is greater than the link budget value.

46. The method of claim 34, wherein the determining the position of the backhaul point comprises determining the position based on a cost of installing the backhaul point at the position on the power line.

47. The method of 46, wherein the cost of installing the backhaul point includes the cost to provide backhaul media at the position.

* * * * *

UNITED STATES PATENT AND TRADEMARK OFFICE
CERTIFICATE OF CORRECTION

| | | |
|---|---|---|
| PATENT NO. | : 7,627,402 B2 | Page 1 of 1 |
| APPLICATION NO. | : 11/254733 | |
| DATED | : December 1, 2009 | |
| INVENTOR(S) | : Mollenkopf et al. | |

It is certified that error appears in the above-identified patent and that said Letters Patent is hereby corrected as shown below:

In column 13, line 67, delete "appended" and insert -- appended. --, therefor.

In column 16, line 43, in Claim 28, after "according" insert -- to --.

In column 18, line 36, in Claim 47, delete "method of 46," and insert -- method of claim 46, --, therefor.

Signed and Sealed this

Sixteenth Day of March, 2010

David J. Kappos
*Director of the United States Patent and Trademark Office*